United States Patent
Ochiai et al.

(10) Patent No.: US 10,274,357 B2
(45) Date of Patent: Apr. 30, 2019

(54) REFRIGERATION CYCLE APPARATUS AND LIQUID LEVEL DETECTION SENSOR

(71) Applicant: Mitsubishi Electric Corporation, Tokyo (JP)

(72) Inventors: Yasutaka Ochiai, Tokyo (JP); Makoto Saito, Tokyo (JP); Masaki Toyoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 50 days.

(21) Appl. No.: 15/505,977

(22) PCT Filed: Oct. 16, 2014

(86) PCT No.: PCT/JP2014/077575
§ 371 (c)(1),
(2) Date: Feb. 23, 2017

(87) PCT Pub. No.: WO2016/059705
PCT Pub. Date: Apr. 21, 2016

(65) Prior Publication Data
US 2017/0276535 A1    Sep. 28, 2017

(51) Int. Cl.
*G01F 23/36*    (2006.01)
*F25B 43/00*    (2006.01)
(Continued)

(52) U.S. Cl.
CPC .............. *G01F 23/36* (2013.01); *F24F 11/30* (2018.01); *F25B 40/04* (2013.01); *F25B 43/00* (2013.01);
(Continued)

(58) Field of Classification Search
CPC ........... G01F 23/36; F24F 11/30; F25B 40/04; F25B 43/006; H01H 35/18
See application file for complete search history.

(56) References Cited

U.S. PATENT DOCUMENTS 5,044,764 A    9/1991    Aoki et al.
6,202,486 B1 *    3/2001    Kemp ..................... G01F 23/22
73/292
(Continued)

FOREIGN PATENT DOCUMENTS

JP    59-027223 A    2/1984
JP    06-201234 A    7/1994
JP    4553201 B2    9/2010

OTHER PUBLICATIONS

International Search Report of the International Searching Authority dated Nov. 18, 2014 for the corresponding International application No. PCT/JP2014/077575 (and English translation).
(Continued)

*Primary Examiner* — Marc E Norman
(74) *Attorney, Agent, or Firm* — Posz Law Group, PLC

(57) ABSTRACT

Provided is a refrigeration cycle apparatus including: a refrigerant circuit formed by connecting, by a refrigerant pipe, a compressor, a condenser, an expansion device, an evaporator and a liquid reservoir; a liquid level detection sensor including a plurality of heat generating units and a plurality of temperature detection units, the heat generating units being paired with the temperature detection units, and provided in the liquid reservoir, the liquid level detection sensor being configured to detect a liquid level of a refrigerant accumulated in the liquid reservoir, based on a temperature of each of the heat generating units, in which the liquid reservoir includes a container for accumulating the refrigerant, an inlet pipe connected to the refrigerant circuit and configured to allow a portion of the refrigerant flowing out of the container to flow into the container, and in which in the container, a shielding portion is provided between an discharge outlet for the refrigerant of the inlet pipe and the liquid level detection sensor, to prevent the portion of the
(Continued)

refrigerant flowing out of the discharge outlet from directly coming into contact with the liquid level detection sensor.

19 Claims, 13 Drawing Sheets

(51) Int. Cl.
    *F25B 49/02*     (2006.01)
    *G01F 23/22*     (2006.01)
    *F24F 11/30*     (2018.01)
    *F25B 40/04*     (2006.01)
    *F25D 17/04*     (2006.01)
    *H01H 35/18*     (2006.01)
    *F24F 5/00*     (2006.01)
    *F25B 13/00*     (2006.01)
    *F25B 40/00*     (2006.01)

(52) U.S. Cl.
    CPC ............ *F25B 49/02* (2013.01); *F25B 49/027* (2013.01); *F25D 17/04* (2013.01); *G01F 23/22* (2013.01); *H01H 35/18* (2013.01); *F24F 5/00* (2013.01); *F25B 13/00* (2013.01); *F25B 40/00* (2013.01); *F25B 2400/04* (2013.01); *F25B 2400/16* (2013.01); *F25B 2500/19* (2013.01); *F25B 2700/04* (2013.01)

(56) References Cited

U.S. PATENT DOCUMENTS 8,261,574 B2 *   9/2012   Sato ........................ F25B 41/00
                                                    62/470
2014/0102665 A1     4/2014   Sibik et al.

OTHER PUBLICATIONS

Extended European Search Report dated May 22, 2018 issued in corresponding EP patent application No. 14903972.9.

* cited by examiner

FIG. 4

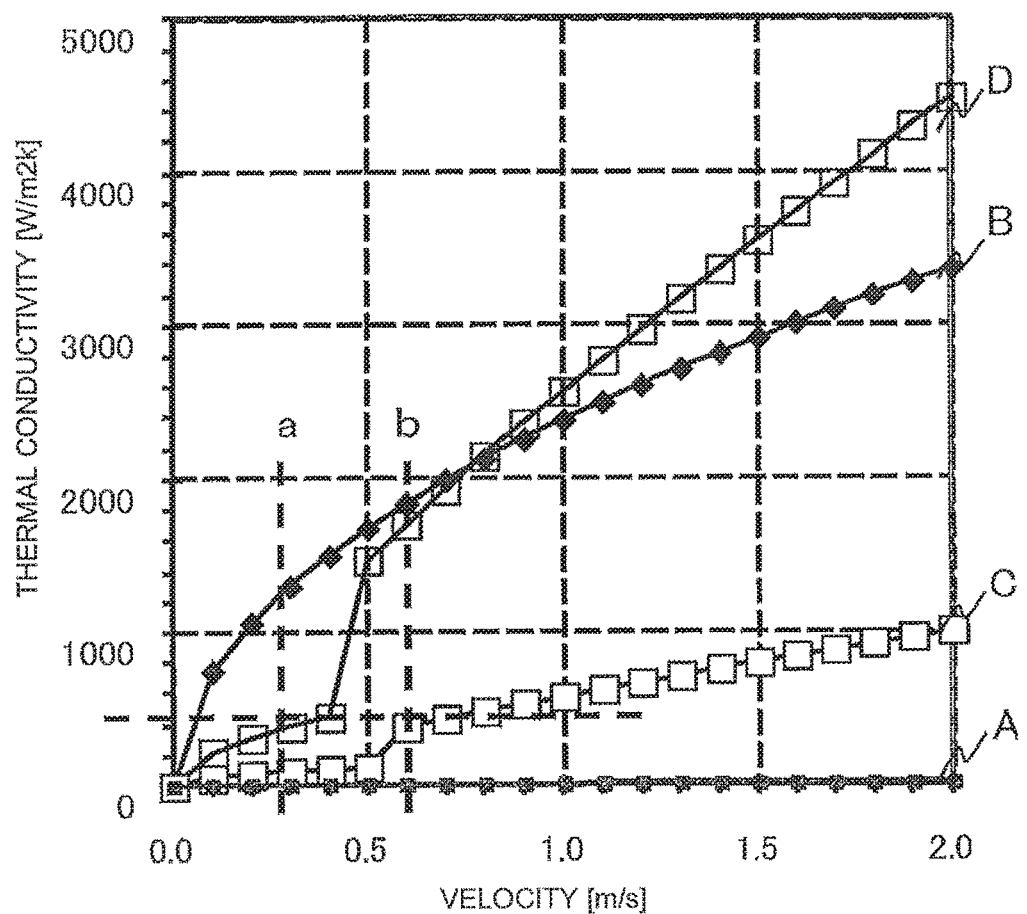

A: AIR
B: WATER
C: GAS REFRIGERANT
D: LIQUID REFRIGERANT
a: FLOW VELOCITY OF LIQUID REFRIGERANT WHEN THERMAL CONDUCTIVITY OF GAS REFRIGERANT AND THERMAL CONDUCTIVITY OF LIQUID REFRIGERANT BECOME EQUAL TO EACH OTHER
b: FLOW VELOCITY OF GAS REFRIGERANT WHEN THERMAL CONDUCTIVITY OF GAS REFRIGERANT AND THERMAL CONDUCTIVITY OF LIQUID REFRIGERANT BECOME EQUAL TO EACH OTHER

REFRIGERATION CYCLE APPARATUS AND LIQUID LEVEL DETECTION SENSOR

CROSS REFERENCE TO RELATED APPLICATION

This application is a U.S. national stage application of PCT/JP2014/077575 filed on Oct. 16, 2014, the contents of which are incorporated herein by reference.

TECHNICAL FIELD

The present invention relates to a refrigeration cycle apparatus and a liquid level detection sensor.

BACKGROUND ART

There has been proposed a related-art liquid reservoir including a liquid level detection sensor used for detection of a height position of a liquid level of a liquid accumulated in the liquid reservoir (see, for example, Patent Literature 1). The liquid reservoir and a liquid level detection mechanism described in Patent Literature 1 include a container configured to store a liquid and a gas therein, a supporting member having an upper end portion connected and fixed to an upper surface portion of the container, a heating resistor mounted to a lower end portion of the supporting member, and a voltmeter configured to detect a voltage applied across both ends of the heating resistor.

A voltage value detected by the voltmeter when the heating resistor is immersed into a liquid surface in the container and a voltage value detected by the voltmeter when the heating resistor is not immersed into the liquid surface and is in contact with the gas differ from each other. Therefore, with the technology described in Patent Literature 1, the liquid level is detected based on the voltage value that differs depending on whether or not the heating resistor (heat generating element) is immersed into the liquid surface.

CITATION LIST

Patent Literature

Patent Literature 1: Japanese Unexamined Patent Application Publication No. S59-27223 (see, for example, FIG. 2)

SUMMARY OF INVENTION

Technical Problem

Now, a case is considered in which the liquid reservoir is mounted in a refrigeration cycle apparatus and a sensor including a heat generating element is used as a unit configured to detect the liquid level in the liquid reservoir. In this case, the above-mentioned liquid and gas respectively correspond to a liquid refrigerant and a gas refrigerant. In the refrigeration cycle apparatus, when the amount of the refrigerant circulating through a refrigerant circuit increases, a flow velocity of the gas refrigerant passing through the liquid reservoir increases correspondingly. When the flow velocity of the gas refrigerant increases, the gas refrigerant acts so as to remove an increased amount of heat of the heat generating element. Specifically, the gas refrigerant acts so as to increase the amount of heat rejected from the heat generating element. Therefore, when the flow velocity of the gas refrigerant increases, a temperature decrease of the heat generating element mounted to the liquid reservoir is promoted correspondingly. Therefore, when the flow velocity of the gas refrigerant increases, the temperature sometimes becomes equal to or close to a temperature obtained when the heat generating element is immersed into the liquid refrigerant.

As described above, when the temperature of the heat generating element being in contact with the gas refrigerant and the temperature of the heat generating element immersed into the liquid refrigerant have the same value or values close to each other, the liquid level cannot be detected with high accuracy.

Specifically, when the technology described in Patent Literature 1 is applied to the refrigeration cycle apparatus, there is a problem in that the accuracy of detection of the liquid level is lowered depending on a refrigerant circulating amount.

The present invention has been made to solve the problem described above, and has an object to provide a refrigeration cycle apparatus and a liquid level detection sensor capable of suppressing a decrease in detection accuracy of a liquid level even when a refrigerant circulating amount is increased.

Solution to Problem

According to one embodiment of the present invention, there is provided a refrigeration cycle apparatus including: a refrigerant circuit formed by connecting, by a refrigerant pipe, a compressor, a condenser, an expansion device, an evaporator and a liquid reservoir; a liquid level detection sensor including a plurality of heat generating units and a plurality of temperature detection units, the heat generating units being paired with the temperature detection units, and provided in the liquid reservoir, the liquid level detection sensor being configured to detect a liquid level of a refrigerant accumulated in the liquid reservoir, based on a temperature of each of the heat generating units, in which the liquid reservoir includes a container for accumulating the refrigerant, an inlet pipe connected to the refrigerant circuit and configured to allow a portion of the refrigerant flowing out of the container to flow into the container, and in which in the container, a shielding portion is provided between an discharge outlet for the refrigerant of the inlet pipe and the liquid level detection sensor, to prevent the portion of the refrigerant flowing out of the discharge outlet from directly coming into contact with the liquid level detection sensor.

Advantageous Effects of Invention

According to the refrigeration cycle apparatus of one embodiment of the present invention with the above-mentioned configuration, the decrease in detection accuracy of the liquid level can be suppressed even when the refrigerant circulating amount is increased.

BRIEF DESCRIPTION OF DRAWINGS

FIG. 4 is a graph for showing temperatures of heat generating elements 201a to 201d of the liquid level detection sensor 20 for each flow velocity of the refrigerant supplied into the liquid reservoir 15.

DESCRIPTION OF EMBODIMENTS

Figure 1:
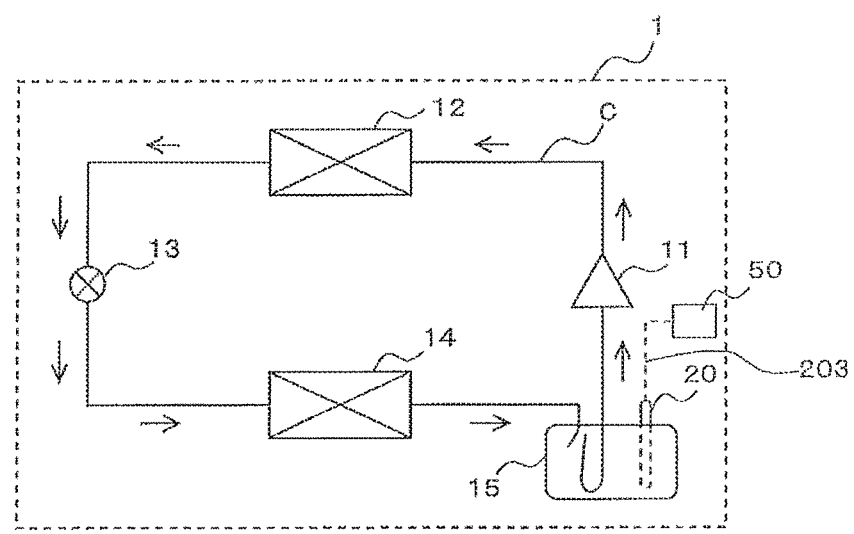
FIG. 1 is a view for illustrating an example of a refrigerant circuit configuration and the like of a refrigeration cycle apparatus 1 according to Embodiment 1 of the present invention.

Now, a refrigeration apparatus according to embodiments of the present invention is described with reference to the drawings. The present invention is not limited to the embodiments described below. Moreover, in the drawings referred to below including FIG. 1, the size relationship between components may be different from reality in some cases.

Embodiment 1

FIG. 1 is a view for illustrating an example of a refrigerant circuit configuration and the like of a refrigeration cycle apparatus 1 according to Embodiment 1 of the present invention. Referring to FIG. 1, a refrigerant circuit and the like of the refrigeration cycle apparatus 1 are described.

The refrigeration cycle apparatus 1 according to Embodiment 1 is improved so as to be capable of suppressing a decrease in detection accuracy of a liquid level even when a refrigerant circulating amount is increased.

[Description of Configuration of Refrigeration Cycle Apparatus 1]

The refrigeration cycle apparatus 1 includes a compressor 11 to be used to deliver a refrigerant, a condenser 12 configured to condense the refrigerant, an expansion device 13 configured to reduce pressure of the refrigerant, an evaporator 14 configured to evaporate the refrigerant, a liquid reservoir 15 functioning as an accumulator configured to accumulate a liquid refrigerant or the like, a liquid level detection sensor 20 to be used to detect a liquid level position of the liquid refrigerant accumulated in the liquid reservoir 15, and a controller 50 configured to calculate the amount of the liquid refrigerant accumulated in the liquid reservoir 15 based on a result of detection by the liquid level detection sensor 20.

Further, the refrigeration cycle apparatus 1 includes an air-sending device 12A placed along the condenser 12 and an air-sending device 14A placed along the evaporator 14. When the refrigeration cycle apparatus 1 is, for example, an air-conditioning apparatus, the air-sending device 12A is mounted to an outdoor unit together with the condenser 12, whereas the air-sending device 14A is mounted to an indoor unit together with the evaporator 14. The air-sending device 12A is used to supply air to the condenser 12 so as to promote heat exchange between the refrigerant flowing through the condenser 12 and the air. Further, the air-sending device 14A is used to supply air to the evaporator 14 to promote heat exchange between the refrigerant flowing through the evaporator 14 and the air.

(Compressor 11 and Condenser 12)

The compressor 11 has a function of compressing a gas refrigerant at a high temperature and a high pressure to discharge the compressed gas refrigerant. The compressor 11 has a refrigerant suction side connected to the liquid reservoir 15 and a refrigerant discharge side connected to the condenser 12. The compressor 11 can be made up of, for example, an inverter compressor. The condenser 12 (radiator) is configured to condense the refrigerant into a high-pressure liquid refrigerant. The condenser 12 has an upstream side connected to the compressor 11 and a downstream side connected to the expansion device 13.

(Expansion Device 13 and Evaporator 14)

The expansion device 13 is configured to reduce the pressure of the refrigerant, and can be made up of, for example, a capillary tube, or an expansion valve capable of adjusting an opening degree. The expansion device 13 has an upstream side connected to the condenser 12 and a downstream side connected to the evaporator 14. The evaporator 14 is configured to evaporate the refrigerant into the gas refrigerant. The evaporator 14 has an upstream side connected to the expansion device 13 and a downstream side connected to the liquid reservoir 15.

(Liquid Reservoir 15 and Liquid Level Detection Sensor 20)

The liquid reservoir 15 is capable of accumulating the liquid refrigerant therein, and includes a container 15A and other members. The liquid reservoir 15 has an upstream side connected to the evaporator 14 and a downstream side connected to the suction side of the compressor 11.

The liquid level detection sensor 20 is mounted to the liquid reservoir 15. The liquid level detection sensor 20 can be made up of a sensor, for example, an NTC sensor or a PTC sensor, which uses a change in element resistance depending on an element temperature. "NTC" is an abbreviation of "negative temperature coefficient", and "PTC" is an abbreviation of "positive temperature coefficient". The liquid level detection sensor 20 is connected to the controller 50 through a wiring 203. Although a wired connection is illustrated as an example in Embodiment 1, the refrigeration cycle apparatus 1 may be configured so that information on the liquid level detection sensor 20 is output wirelessly to the controller 50.

The liquid reservoir 15 and the liquid level detection sensor 20 are described later in detail referring to FIG. 2A and other figures.

(Controller 50)

The controller 50 includes a power supply circuit unit configured to supply a voltage (power) to the liquid level detection sensor 20, a computation circuit unit configured to compute temperatures of heat generating elements 201a to 201d (see FIG. 2B) of the liquid level detection sensor 20, a storage unit configured to store, for example, a predetermined table for showing a relationship between resistance values of the heat generating elements 201a to 201d and the temperatures, and other units.

For example, when the liquid level detection sensor 20 is the PTC sensor, the resistance values of the heat generating elements 201a to 201d increase as the temperatures of the heat generating elements 201a to 201d increase. When the heat generating elements 201a to 201d are in contact with the liquid refrigerant, the temperatures of the heat generating elements 201a to 201d decrease to be lower than temperatures when the heat generating elements are in contact with the gas refrigerant. Therefore, the resistance values of the heat generating elements 201a to 201d decrease correspondingly. On the other hand, when the heat generating elements 201a to 201d are in contact with the gas refrigerant and a velocity of the gas refrigerant is not so high, the resistance values become higher than those when the heat generating elements are in contact with the liquid refrigerant.

As described above, the resistance values of the heat generating elements 201a to 201d differ depending on whether the heat generating elements 201a to 201d of the liquid level detection sensor 20 are in contact with the liquid refrigerant or the gas refrigerant.

For example, the controller 50 computes the resistance values of the heat generating elements 201a to 201d from voltage values, current values, and other values respectively supplied to the heat generating elements 201a to 201d. Further, the controller 50 computes the respective temperatures from the resistance values of the heat generating elements 201a to 201d by using the predetermined table. Then, the controller 50 determines where a height position of a liquid level in the container 15A is located based on the temperatures of the heat generating elements 201a to 201d.

As an example, when the resistance value of the heat generating element 201d is a and the resistance values of the heat generating elements 201a to 201c are b that is larger than a, the temperatures of the heat generating elements 201a to 201c are higher than the temperature of the heat generating element 201d. Therefore, it can be determined that the height position of the liquid level in the container 15A is higher than the heat generating element 201d and is lower than the heat generating element 201c.

As described above, the heat generating elements 201a to 201d have not only a function as elements configured to generate heat but also a function as elements having resistances that change depending on an ambient environment (e.g., squirt of the refrigerant). Then, the controller 50 determines the height of the liquid level based on the resistance values. Here, the heat generating elements 201a to 201d correspond to both a heat generating unit and a temperature detection unit.

The controller 50 is capable of determining whether or not the liquid refrigerant in the liquid reservoir 15 overflows from the container 15A based on the result of detection by the liquid level detection sensor 20, determining whether or not the refrigerant filling the refrigerant circuit of the refrigeration cycle apparatus 1 leaks, and calculating the amount of the filling refrigerant when the refrigeration cycle apparatus 1 is filled with the refrigerant after installation thereof.

Although a case where the controller 50 calculates the temperatures from the resistance values has been described in Embodiment 1, the controller 50 is not limited thereto. For example, when the liquid level detection sensor 20 is the PTC sensor, the resistance value and the temperature have a proportional relationship. Therefore, the controller 50 may be configured to compare values of the resistance values of the heat generating elements 201a to 201d without converting the resistance values into the temperatures.

Further, although the mode in which the heat generating elements 201a to 201d have both the function as the elements configured to generate heat and the function as the elements having changing resistances has been described in Embodiment 1, the heat generating elements are not limited thereto. For example, different configurations may be respectively provided with the two functions. For example, the liquid level detection sensor 20 may be configured such that a heating body and a temperature sensor, which is independent of the heating body and is placed along the heating body, are provided to a sheath 202 in place of the heat generating elements 201a to 201d. Here, for example, a thermistor can be adopted as the temperature sensor. Further, for example, a resistor can be adopted as the heating body. Then, the resistor can heat itself by being energized. In this case, the heating body corresponds to the heat generating unit, and the temperature sensor corresponds to the temperature detection unit.

In Embodiment 1, the mode in which four heat generating elements 201a to 201d are provided in total has been described. Therefore, four sets of the heating bodies and the temperature sensors are provided to the sheath 202. Even in this mode, functions similar to those of the liquid level detection sensor 20 of the refrigeration cycle apparatus 1 according to Embodiment 1 can be obtained.

[Description of Configurations of Liquid Reservoir 15 and Liquid Level Detection Sensor 20]

Figure 2A:
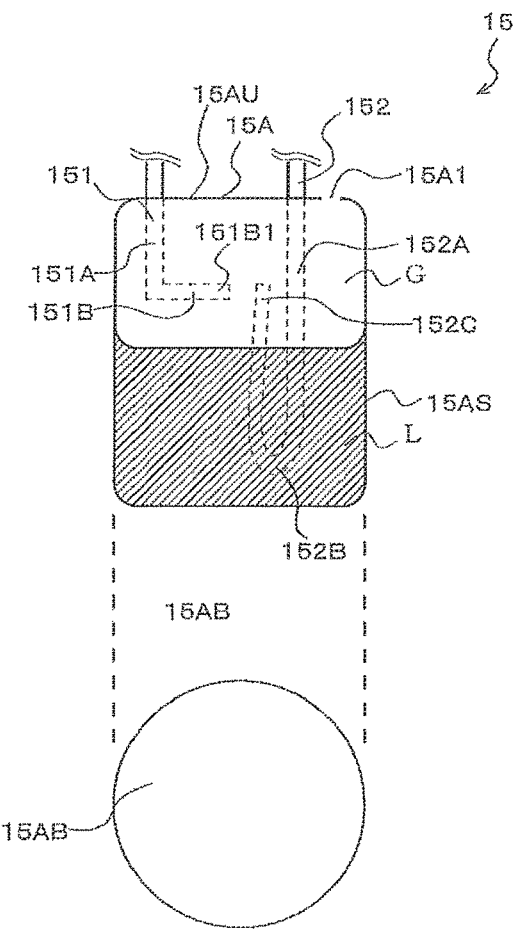
FIG. 2A is a view of a schematic configuration example of a liquid reservoir 15 included in the refrigeration cycle apparatus 1 according to Embodiment 1 of the present invention.
Figure 2B:
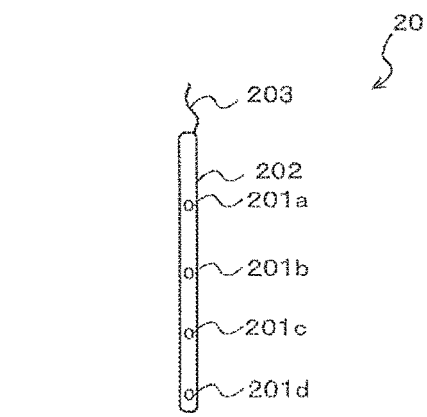
FIG. 2B is a view of a schematic configuration example of a liquid level detection sensor 20 included in the refrigeration cycle apparatus 1 according to Embodiment 1 of the present invention.

FIG. 2A is a view of a schematic configuration example of the liquid reservoir 15 included in the refrigeration cycle apparatus 1 according to Embodiment 1. FIG. 2B is a view of a schematic configuration example of the liquid level detection sensor 20 included in the refrigeration cycle apparatus 1 according to Embodiment 1. Referring to FIG. 2A and FIG. 2B, configurations of the liquid reservoir 15 and the liquid level detection sensor 20 and the like are described. In FIG. 2A, a state in which a liquid refrigerant L and a gas refrigerant G are present inside the container 15A is schematically illustrated.

(Liquid Reservoir 15)

The liquid reservoir 15 has the container 15A capable of accumulating the liquid refrigerant therein. Further, the liquid reservoir 15 has an inlet pipe 151 connected to an upper surface portion 15AU of the container 15A, into which the refrigerant flowing out of the evaporator 14 flows. Further, the liquid reservoir 15 has an outlet pipe 152 connected to the upper surface portion 15AU of the container 15A, through which the refrigerant in the container 15A flows out toward the compressor 11.

An upper end side of the liquid level detection sensor 20 is fixed to the upper surface portion 15AU of the container 15A. Therefore, an opening port 15A1 to be used to insert the liquid level detection sensor 20 thereto is formed in the upper surface portion 15AU of the container 15A. In a state in which the refrigerant circulates through a refrigerant circuit C of the refrigeration cycle apparatus 1, the liquid refrigerant heavier than the gas refrigerant is accumulated on a bottom surface side of the container 15A, whereas the gas refrigerant lighter than the liquid refrigerant flows on an upper surface side of the container 15A. The container 15A may be made up of, for example, a pressure vessel having a thickness of from about 4 mm to about 10 mm. Further, the container 15A is formed into a cylindrical shape. As the liquid reservoir 15, there exist a type having the vertically placed cylindrical container 15A (vertical liquid reservoir) and a type having the horizontally placed cylindrical container 15A (horizontal liquid reservoir). In Embodiment 1, a case where the liquid reservoir 15 is the vertical liquid reservoir is described as an example.

In the refrigeration cycle apparatus 1, the inlet pipe 151 and the liquid level detection sensor 20 are provided to the container 15A so as to form a core region B described later inside the container 15A in order to suppress a decrease in detection accuracy of the liquid level detection sensor 20 due to the squirt of the refrigerant discharged from the inlet pipe 151 onto the liquid level detection sensor 20.

The inlet pipe 151 includes a first pipe portion 151A extending in a vertical direction and a second pipe portion 151B extending in a horizontal direction. The first pipe portion 151A and the second pipe portion 151B are connected so as to communicate to each other. Here, the second pipe portion 151B is parallel to the horizontal direction. Therefore, direct collision of the refrigerant flowing out of the second pipe portion 151B into the container 15A against a liquid surface of the liquid refrigerant inside the container 15A can be suppressed, thereby suppressing oscillation of the liquid surface. As a result, the detection accuracy of the liquid level detection sensor 20 can be improved.

The first pipe portion 151A has one end (upstream side) connected to the evaporator 14 and an other end (downstream side) connected to the second pipe portion 151B. The second pipe portion 151B has one end (upstream side) connected to the first pipe portion 151A and an other end side positioned inside the container 15A. The other end of the second pipe portion 151B is open. Specifically, a discharge outlet portion 151B1 having a discharge outlet A (see FIG. 4) through which the refrigerant flowing through the evaporator 14 and the first pipe portion 151A passes when being discharged into the container 15A is formed at the other end of the second pipe portion 151B.

The outlet pipe 152 includes a first pipe portion 152A extending in the vertical direction, a second pipe portion 152B positioned on a bottom surface portion side of the container 15A, and a third pipe portion 152C having an open distal end. The first pipe portion 152A and the second pipe portion 152B are connected so as to communicate to each other, and the second pipe portion 152B and the third pipe portion 152C are connected so as to communicate to each other.

The first pipe portion 152A has one end (downstream side) connected to the suction side of the compressor 11 and an other end (upstream side) connected to the second pipe portion 152B.

The second pipe portion 152B has one end (downstream side) connected to the first pipe portion 152A and an other end (upstream side) connected to the third pipe portion 152C.

The second pipe portion 152B extends downward from a connected portion to the first pipe portion 152A so as to be formed in a bent manner and then extends upward to be connected to the third pipe portion 152C. The second pipe portion 152B is arranged on a side close to a bottom surface portion 15AB of the container 15A, and is immersed in the liquid refrigerant when the liquid refrigerant is accumulated in the container 15A as illustrated in FIG. 2A.

The third pipe portion 152C has one end (downstream side) connected to the second pipe portion 152B and an other end being open. Specifically, an opening through which the refrigerant (mainly, the gas refrigerant) inside the container 15A passes is formed at the other end of the third pipe portion 152C.

(Liquid Level Detection Sensor 20)

The liquid level detection sensor 20 is installed on a side where the second pipe portion 151B extends when the first pipe portion 151A of the inlet pipe 151 is regarded as a border. The liquid level detection sensor 20 has an upper end side mounted and fixed to the upper surface portion 15AU of the container 15A of the liquid reservoir 15. The liquid level detection sensor 20 includes the sheath 202 having an elongated shape and the heat generating elements 201a to 202d arranged in tandem in a longitudinal direction of the sheath 202. The wiring 203 that is used to supply the voltage (power) to the heat generating elements 201a to 202d is connected to the liquid level detection sensor 20.

The sheath 202 is an elongated pipe-like member. The heat generating elements 201a to 201d are arranged on the sheath 202 so as to be provided in tandem in the longitudinal direction. More specifically, the heat generating element 201a, the heat generating element 201b, the heat generating element 201c, and the heat generating element 201d are arranged at equal intervals on the sheath 202 in order from the top. Further, inside the pipe of the sheath 202, a wire (not shown) to be used to supply the voltage (power) to the heat generating elements 201a to 201d is provided. The wire may be made of, for example, a precious metal.

Each of the heat generating elements 201a to 201d can be made up of the PTC elements, the NTC elements, or other such elements. The heat generating elements 201a to 201d generate heat by the power supplied from the controller 50. Each of the heat generating elements 201a to 201d has a given relationship between its own heat (temperature) and its own resistance value. For example, in the case of the PTC element, a proportional relationship is established between its own temperature and the resistance value. Further, in the case of the NTC element, an inversely proportional relationship is established between its own temperature and the resistance value.

[Regarding Core Region B]

Figure 3:
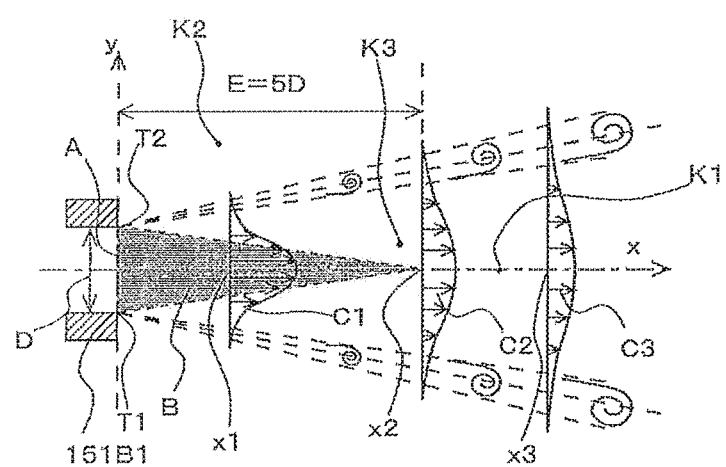
FIG. 3 is an explanatory diagram of a core region B in the refrigeration cycle apparatus 1 according to Embodiment 1 of the present invention.

FIG. 3 is an explanatory diagram of the core region B in the refrigeration cycle apparatus 1 according to Embodiment 1. In FIG. 3, the discharge outlet portion 151B1 is viewed on a cross section so as to pass through an axial center. Referring to FIG. 3, the core region B and others are described.

In FIG. 3, the illustration of the outlet pipe 152 is omitted.

As illustrated in FIG. 3, the refrigerant discharged from the discharge outlet A of the discharge outlet portion 151B1 travels in the axial direction of the discharge outlet portion 151B1 while spreading radially. Specifically, the refrigerant discharged out of the discharge outlet A travels in the axial direction (x-axis direction) of the discharge outlet portion 151B1 while spreading in a radial direction (y-axis direction) of the discharge outlet portion 151B1. Here, the x axis illustrated in FIG. 3 is parallel to the axial direction of the discharge outlet portion 151B1, while the y axis is parallel to the radial direction of the discharge outlet portion 151B1.

As the refrigerant travels in the x-axis direction, a flow velocity distribution of the refrigerant in the y-axis direction changes. The flow velocity distribution is now described. Here, the flow velocity distribution at three predetermined positions on the x axis is described as an example. Specifically, a flow velocity distribution C1 at coordinates x1 on the x axis, which are the closest to the discharge outlet portion 151B1, a flow velocity distribution C2 at a second closest position x2 on the x axis to the discharge outlet portion 151B1, and a flow velocity distribution C3 at coordinates x3 on the x axis, which are the farthest from the discharge outlet portion 151B1, are described.

The coordinates x2 are about five times an inner diameter D of the discharge outlet portion 151B1. More specifically, the coordinates x2 are a position located forward on the x axis by 5D based on a position of the discharge outlet A of the discharge outlet portion 151B1 as a reference.

It is understood that the flow velocity distribution C1 has a large refrigerant flow velocity on the x axis (with a y-coordinate being 0) and the vicinity thereof. Then, it is also understood that the flow velocity distribution C1 has a refrigerant flow velocity that is rapidly attenuated when the y-coordinate increases or decreases. As described above, at a position not so far away from the discharge outlet portion 151B1, the flow velocity distribution of the refrigerant is a spike distribution. Therefore, the flow velocity distribution C1 at the coordinates x1 cannot be approximated by a Gaussian distribution.

Although the flow velocity distribution C2 is slightly large on the x axis (with the y coordinate being 0) and the vicinity thereof, it is understood that the flow velocity distribution C2 is not large in comparison to the flow velocity distribution C1. Then, it is also understood that the refrigerant flow velocity is gently attenuated when the y coordinate increases or decreases. The flow velocity distribution of the refrigerant at the coordinates x2 can be approximated by the Gaussian distribution. Specifically, although the flow velocity distribution cannot be approximated by the Gaussian distribution at the coordinates x1 closer to the discharge outlet portion 151B1 than the coordinates x2, the flow velocity distribution of the refrigerant can be approximated by the Gaussian distribution at the coordinates x2.

It is understood that the flow velocity distribution C3 has the refrigerant flow velocity fairly attenuated on the x axis (with the y coordinate being 0) and in the vicinity thereof. Then, it is also understood that the flow velocity distribution C3 has the refrigerant flow velocity that is attenuated further gently as compared to the flow velocity distribution C2 when the y coordinate increases or decreases. The flow velocity distribution of the refrigerant at the coordinates x3 can be approximated by the Gaussian distribution.

Here, distal end portions on an inner surface of the discharge outlet portion 151B1 are defined as a point T1 and a point T2. In this case, FIG. 3 is an illustration of a cross section of the discharge outlet portion 151B1. Therefore, a line segment connecting the point T1 and the point T2 corresponds to a diameter of the discharge outlet portion 151B1. In other words, when a cross section of the discharge outlet portion 151B1 is viewed on a plane parallel to the y axis, a center angle formed by the point T1 and the point T2 becomes 180 degrees.

A triangular region formed by the point T1, the point T2, and the coordinates x2 is referred to as the core region B. Although the region is viewed on the cross section and thus has a triangular shape, the discharge outlet portion 151B1 has a cylindrical shape in practice. Therefore, the core region B has a conical shape. In the core region B, the flow velocity distribution of the refrigerant is not the Gaussian distribution, and is the spike distribution. Therefore, the flow velocity of the refrigerant in the core region B tends to be high. Specifically, the core region B represents a conical closed space formed between the preset position (x2) on the central axis (x axis) of the discharge outlet portion 151B1 and distal end edges of the inner surface of the discharge outlet portion 151B1, in which the flow velocity of the refrigerant becomes a specific flow velocity or higher. In the refrigeration cycle apparatus 1 according to Embodiment 1, the liquid level detection sensor 20 is not installed in the core region B.

The liquid level detection sensor 20 can be installed at a position, for example, out of the core region B, which is opposed to the discharge outlet A (see a point K1 of FIG. 3). Specifically, the liquid level detection sensor 20 can be installed at the position on the x axis, which is far from the coordinates x1.

Further, the liquid level detection sensor 20 can also be installed at a position, for example, out of the core region B, which is not opposed to the discharge outlet A (see a point K2 of FIG. 3).

Still further, the liquid level detection sensor 20 can also be installed at a position, for example, out of the core region B, which is opposed to the discharge outlet A (see a point K3 of FIG. 3).

Effects of Embodiment 1

FIG. 4 is a graph for showing the temperatures of the heat generating elements 201a to 201d of the liquid level detection sensor 20 for each flow velocity of the refrigerant supplied into the liquid reservoir 15. Next, effects of the refrigeration cycle apparatus 1 according to Embodiment 1 are described.

As shown in FIG. 4, the gas refrigerant has a thermal conductivity at a level equal to that of the liquid refrigerant when the velocity thereof increases. Specifically, a thermal conductivity of the liquid refrigerant at a velocity indicated by a dotted line a and a thermal conductivity of the gas refrigerant at a velocity indicated by a dotted line b are approximately equal to each other. When the amount of the refrigerant circulating in the refrigeration cycle apparatus 1 increases, the velocity of the gas refrigerant increases along therewith. When the refrigeration cycle apparatus 1 is, for example, an air-conditioning apparatus, a thermal load in an air-conditioned space in which the indoor unit is installed increases to increase the amount of the refrigerant circulating in the refrigerant circuit C.

When the refrigerant circulating amount increases to increase the velocity of the gas refrigerant inside the container 15A, the refrigerant is placed in a state at a level equal to the thermal conductivity of the liquid refrigerant. In this state, there is no temperature difference or an extremely small temperature difference between a liquid phase and a gaseous phase in the container 15A. This becomes a factor of decrease in the detection accuracy for the liquid level by the liquid level detection sensor 20.

Then, when the refrigerant circulating amount further increases to further increase the velocity of the gas refrigerant in the container 15A, the thermal conductivity of the gas refrigerant exceeds the thermal conductivity of the liquid refrigerant. This condition corresponds to vertically inversed positions of the liquid refrigerant and the gas refrigerant. Therefore, there is a possibility that the liquid level cannot be detected precisely.

Figure 5:
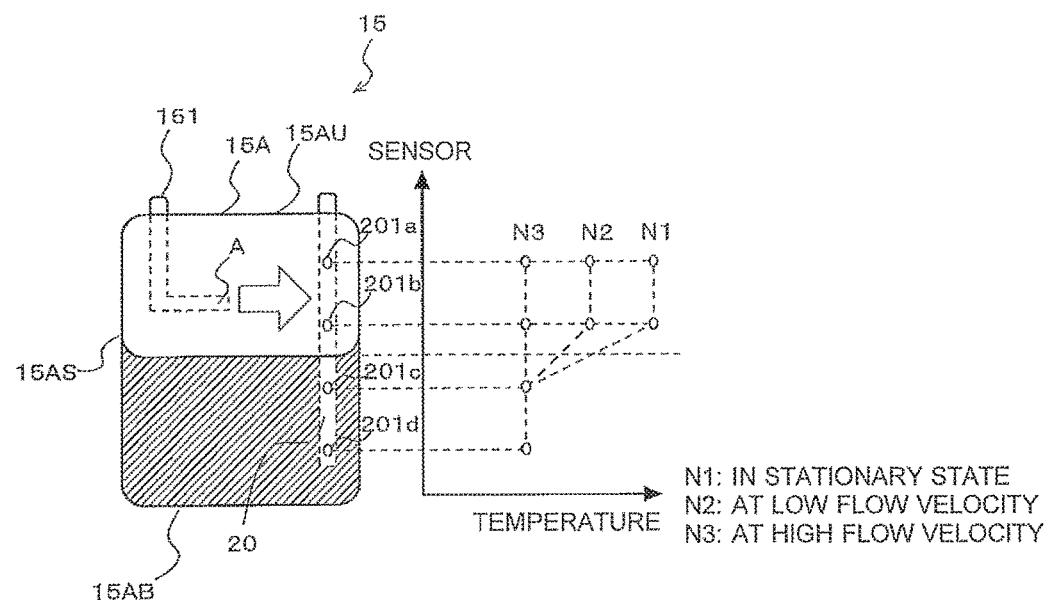
FIG. 5 is an explanatory diagram of a relationship between velocities and thermal conductivities of air, water, a gas refrigerant, and a liquid refrigerant.

FIG. 5 is an explanatory diagram of a relationship between the velocities and the thermal conductivities of air, water, the gas refrigerant, and the liquid refrigerant. In FIG. 5, A indicates the relationship between the temperature and the thermal conductivity of air, B indicates that of water, C indicates that of the gas refrigerant, and D indicates that of the liquid refrigerant. In the case of air and water, the thermal conductivity is small even when the flow velocity of air increases. Therefore, the thermal conductivity of water and that of air do not become equal to each other. Thus, a gaseous part (air) is not erroneously determined as a liquid part (water). In the case of the gas refrigerant and the liquid refrigerant, however, the thermal conductivities become equal to each other in some cases.

As compared to the gas refrigerant, the velocity of the liquid refrigerant in the container 15A is likely to be constant. For convenience of description, a case where the velocity of the liquid refrigerant is constant at a value corresponding to the dotted line a is described as an example.

When the refrigerant does not flow from the inlet pipe 151 into the container 15A (N1) as illustrated in FIG. 5, the temperatures of the heat generating element 201a and the heat generating element 201b become lower than the temperatures of the heat generating element 201c and the heat generating element 201d.

Further, as illustrated in FIG. 5, even when the liquid level detection sensor 20 is installed at the position out of the core region B (N2), the velocity of the gas refrigerant is attenuated. Therefore, the temperatures of the heat generating element 201a and the heat generating element 201b become lower than the temperatures of the heat generating element 201c and the heat generating element 201d. As compared to the case where the refrigerant does not flow from the inlet pipe 151 into the container 15A (N1), however, a temperature difference therebetween is reduced.

Still further, when the liquid level detection sensor 20 is installed in the core region B (N3) as illustrated in FIG. 5, the velocity of the gas refrigerant is large. A difference between the temperatures of the heat generating element 201a and the heat generating element 201b and the temperatures of the heat generating element 201c and the heat generating element 201d is eliminated. In this case, the liquid level cannot be detected by the liquid level detection sensor 20.

In the refrigeration cycle apparatus 1 according to Embodiment 1, the liquid level detection sensor 20 is installed at the position out of the core region B, specifically, at the position in the space inside the container 15A other than the core region B. Therefore, a decrease in the detection accuracy for the liquid level can be suppressed.

In Embodiment 1, the liquid level detection sensor 20 has been described as including the plurality of heat generating elements 201a to 201d, but the number of heat generating elements is not limited thereto. For example, a single heat generating element may be provided. When the single heat generating element is provided, the liquid level detection sensor 20 functions as a switch configured to detect whether or not the liquid level has reached a preset height.

The liquid level detection sensor 20 can also be used as a sensor in an overflow detection technology for detecting overflow of the liquid refrigerant from the container 15A of the liquid reservoir 15, and is capable of preventing backflow of the liquid refrigerant to the compressor 11 so as to prevent a failure of the compressor 11, thereby enhancing reliability of the compressor 11.

The refrigeration cycle apparatus 1 can obtain the amount of liquid in the container 15A of the liquid reservoir 15 at the time when the refrigerant circuit C is filled with the refrigerant after installation thereof in a building, for example. Therefore, the refrigerant circuit C can be prevented from being excessively filled with the refrigerant.

Whether or not the refrigerant filling the refrigeration cycle apparatus 1 is leaking can be detected during an operation of the refrigeration cycle apparatus 1. Therefore, the refrigerant leakage can be detected early, thereby suppressing global warming. Specifically, the leakage of the refrigerant, e.g., a flammable refrigerant, can be detected early. For example, occurrence of a serious accident, e.g., a fire, can be prevented.

Although a case where the liquid reservoir 15 is installed on a low-pressure side of the refrigerant circuit C has been described as an example in Embodiment 1, the installation of the liquid reservoir 15 is not limited thereto. For example, the liquid reservoir 15 may be installed on a high pressure side of the refrigerant circuit C.

Although the refrigeration cycle apparatus 1 according to Embodiment 1 has been described taking a case where the liquid level detection sensor 20 includes the heat generating elements 201a to 201d as an example, the liquid level detection sensor 20 is not limited thereto. Specifically, the heat generating elements 201a to 201d have a configuration serving both as the heat generating unit and the sensor unit.

Therefore, the liquid level detection sensor 20 may employ a mode in which the heat generating unit and the sensor unit are separately provided.

Modification Example 1

Figure 6:
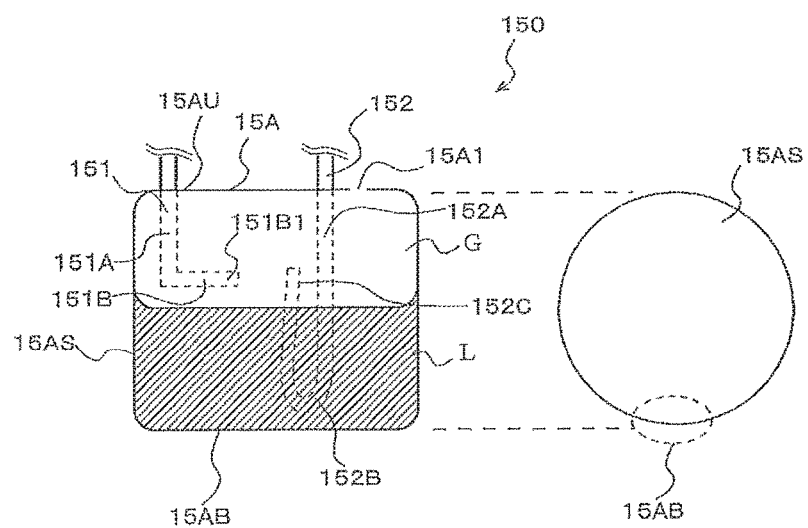
FIG. 6 is a view of a schematic configuration example of a liquid reservoir 150 employing a mode in which a container 15A is horizontally placed (horizontal liquid reservoir).

FIG. 6 is a view of a schematic configuration example of a liquid reservoir 150 employing a mode in which the container 15A is horizontally placed (horizontal liquid reservoir). Although the vertical liquid reservoir in which a circular surface of the container 15A serves as the bottom surface portion 15AB has been described in Embodiment 1, the liquid reservoir is not limited thereto. For example, as illustrated in FIG. 6, in the case of the horizontal liquid reservoir 150 having a cylindrical surface serving as the bottom surface 15AB, the same effects as those of the refrigeration cycle apparatus 1 according to Embodiment 1 can be obtained. In Modification Example 1, the circular surface forms a part of a side surface portion 15AS. When the container 15A is configured as in Modification Example 1, a cylindrical surface serves as the bottom surface portion 15AB. Therefore, it is preferred that a supporting member (not shown) be installed as needed so as to prevent the container 15A from rolling.

Modification Examples 2 to 5

Figure 7A:
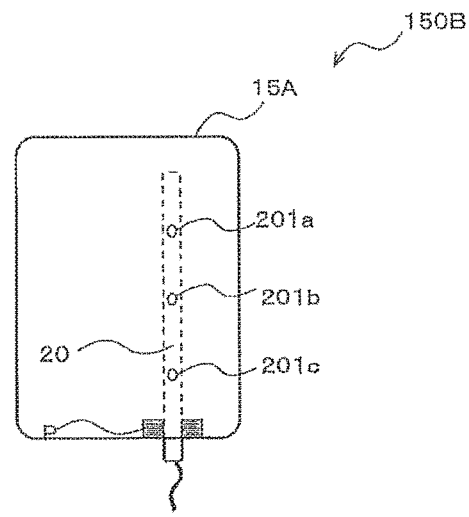
FIG. 7A is an illustration of Modification Example 2 (liquid reservoir 150B) of the container 15A and the liquid level detection sensor 20 of the refrigeration cycle apparatus 1 according to Embodiment 1 of the present invention.

FIG. 7A is an illustration of Modification Example 2 (liquid reservoir 150B) of the container 15A and the liquid level detection sensor 20 of the refrigeration cycle apparatus 1 according to Embodiment 1. In Modification Example 2 and Modification Examples 3 and 4 described later, a case where the number of heat generating elements is three is described. In Embodiment 1, the opening port 15A1 is formed in the upper surface portion 15AU of the container 15A, and the upper end side of the liquid level detection sensor 20 is fixed at the position where the opening port 15A1 is formed. However, the opening port and the liquid level detection sensor are not limited thereto. For example, an opening port (not shown) may be formed in the bottom surface portion 15AB of the container 15A, and a lower end side of the liquid level detection sensor 20 may be fixed at a position where the opening port is formed. Even in Modification Example 2, the same effects as those of a refrigeration cycle apparatus 100 according to Embodiment 1 can be obtained.

When the opening port for providing the liquid level detection sensor 20 therein is formed in the bottom surface portion 15AB as in Modification Example 2, for example, a packing member P may be provided at the position where the opening port is formed. In this manner, the liquid refrigerant in the container 15A can be prevented from flowing out thereof.

Figure 7B:
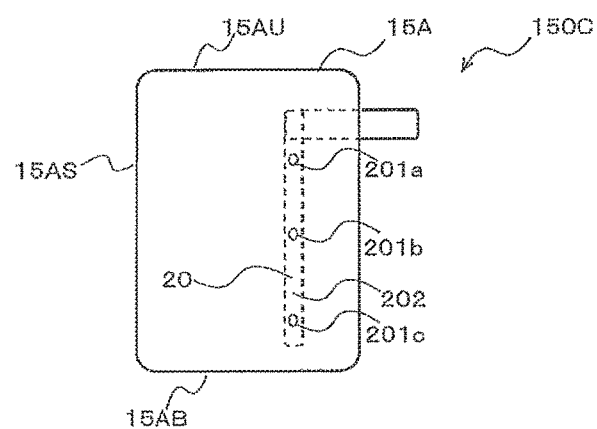
FIG. 7B is an illustration of Modification Example 3 (liquid reservoir 150C) of the container 15A and the liquid level detection sensor 20 of the refrigeration cycle apparatus 1 according to Embodiment 1 of the present invention.

FIG. 7B is an illustration of Modification Example 3 (liquid reservoir 150C) of the container 15A and the liquid level detection sensor 20 of the refrigeration cycle apparatus 1 according to Embodiment 1. For example, an opening port (not shown) may be formed in the cylindrical side surface portion 15AS of the container 15A, and an end portion side of the liquid level detection sensor 20 may be fixed at a position where the opening port is formed. Even in Modification Example 3, the same effects as those of the refrigeration cycle apparatus 100 according to Embodiment 1 can be obtained.

In Modification Example 4 and Modification Example 5 described subsequently, the liquid level detection sensor 20 includes a plurality of the sheaths 202, and employs a mode in which height positions at which the heat generating elements 201a to 201c are respectively installed are different on each of the sheaths 202.

Figure 7C:
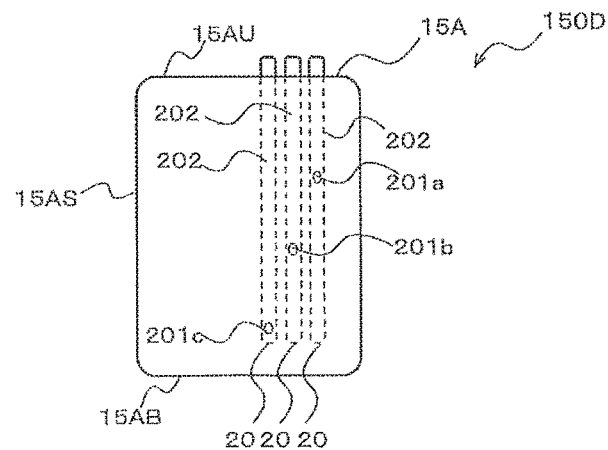
FIG. 7C is an illustration of Modification Example 4 (liquid reservoir 150D) of the container 15A and the liquid level detection sensor 20 of the refrigeration cycle apparatus 1 according to Embodiment 1 of the present invention.

FIG. 7C is an illustration of Modification Example 4 (liquid reservoir 150D) of the container 15A and the liquid level detection sensor 20 of the refrigeration cycle apparatus 1 according to Embodiment 1. For example, a plurality of opening ports (not shown) may be formed in the upper surface portion 15AU of the container 15A so that the liquid level detection sensors 20 are respectively provided at the positions where the opening ports are formed. The number of the liquid level detection sensors 20 included in the liquid reservoir 150D is three. The heat generating elements 201a to 201c are respectively provided to the liquid level detection sensors 20 in a one-by-one fashion. The first liquid level detection sensor 20 includes the heat generating element 201c provided to a lower end side of the sheath 202, the second liquid level detection sensor 20 includes the heat generating element 201b provided in a middle portion of the sheath 202, and the third liquid level detection sensor 20 includes the heat generating element 201a provided to an upper side of the sheath 202. Even in Modification Example 4, the same effects as those of the refrigeration cycle apparatus 1 according to Embodiment 1 can be obtained.

Figure 7D:
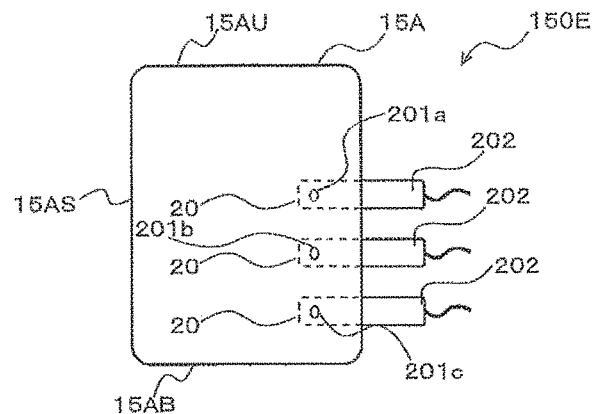
FIG. 7D is an illustration of Modification Example 5 (liquid reservoir 150E) of the container 15A and the liquid level detection sensors 20 of the refrigeration cycle apparatus 1 according to Embodiment 1 of the present invention.

FIG. 7D is an illustration of Modification Example 5 (liquid reservoir 150E) of the container 15A and the liquid level detection sensors 20 of the refrigeration cycle apparatus 1 according to Embodiment 1. Modification Example 4 employs a mode in which the plurality of opening ports are formed in the upper surface portion 15AU so that the liquid level detection sensor 20 are respectively provided at the positions where the opening ports are formed. In the liquid reservoir 150E, a plurality of opening ports are formed in the cylindrical side surface portion 15AS of the container 15A so that the liquid level detection sensors 20 are respectively provided at the positions where the opening ports are formed. Even in Modification Example 5, the same effects as those of the refrigeration cycle apparatus 1 according to Embodiment 1 can be obtained.

Modification Example 6

Figure 8:
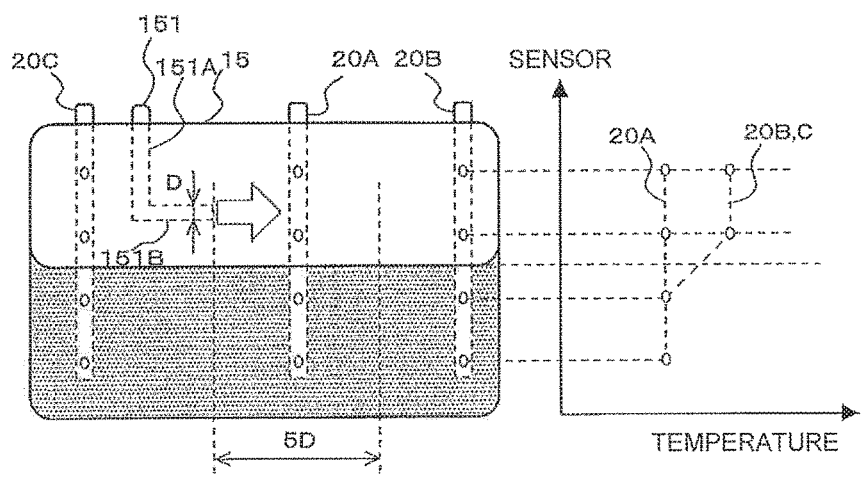
FIG. 8 is a view of a schematic configuration example of a mode in which a liquid level detection sensor 20C is installed on a side opposite to a side where a second pipe portion 151B extends when a first pipe portion 151A of an inlet pipe 151 provided in the container 15A is regarded as a border.

FIG. 8 is a view of a schematic configuration example of a mode in which a liquid level detection sensor 20C is installed on a side opposite to a side where the second pipe portion 151B extends when the first pipe portion 151A of the inlet pipe 151 provided in the container 15A is regarded as a border. A liquid level detection sensor 20A is installed in the core region B. A liquid level detection sensor 20B is installed out of the core region B. The liquid level detection sensor 20B corresponds to Embodiment 1. Modification Example 6 corresponds to the liquid level detection sensor 20C.

In the refrigeration cycle apparatus 1 according to Embodiment 1, the mode in which the liquid level detection sensor 20 is installed so as be located out of the core region B has been described. Further, the liquid level detection sensor 20 is installed on the side where the second pipe portion 151B extends when the first pipe portion 151A of the inlet pipe 151 is regarded as a border.

In Modification Example 6, the liquid level detection sensor 20 is arranged on the side opposite to the side where the second pipe portion 151B extends when the first pipe portion 151A of the inlet pipe 151 is regarded as the border. The liquid level detection sensor 20 is not only located out of the core region B but also arranged so as not to be opposed to the discharge outlet A of the second pipe portion 151B. Even in Modification Example 6, the same effects as those of the refrigeration cycle apparatus 1 according to Embodiment 1 can be obtained.

Embodiment 2

Figure 9:
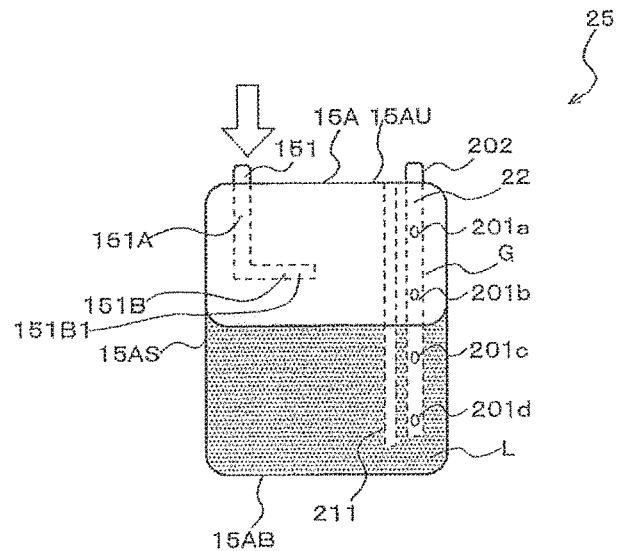
FIG. 9 is a view of a schematic configuration example of a state in which a shielding plate 211 is installed for a liquid level detection sensor 22 included in a refrigeration cycle apparatus according to Embodiment 2 of the present invention.
Figure 10A:
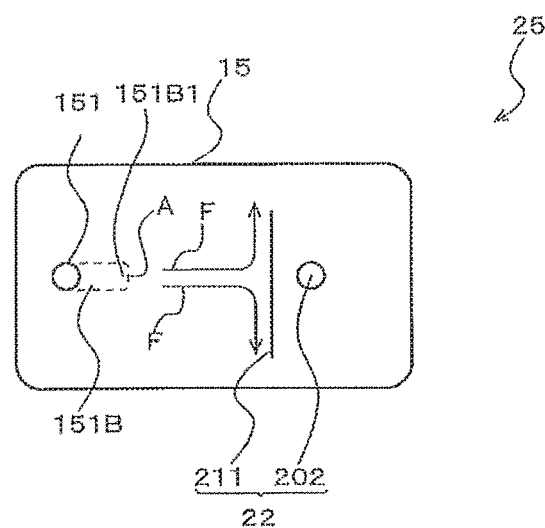
FIG. 10A is a view of the liquid reservoir 15 and the liquid level detection sensor 20 illustrated in FIG. 9 as viewed from an upper surface portion 15AU side.

FIG. 9 is a view of a schematic configuration example of a state in which a shielding plate 211 is installed for a liquid level detection sensor 22 included in a refrigeration cycle apparatus according to Embodiment 2 of the present invention. FIG. 10A is a view of the liquid reservoir 15 and the liquid level detection sensor 20 illustrated in FIG. 9 as viewed from the upper surface portion 15AU side. In Embodiment 2, configurations common to Embodiment 1 are denoted by the same reference symbols, and differences are mainly described. Embodiment 2 differs from Embodiment 1 in that the shielding plate 211 capable of suppressing direct collision of the refrigerant discharged from the discharge outlet portion 151B1 against the liquid level detection sensor 20 is provided. The shielding plate 211 described in Embodiment 2 corresponds to a shielding portion.

The liquid level detection sensor 22 includes the shielding plate 211 arranged at a position opposed to the sheath 202. The shielding plate 211 is a flat plate-like member formed so as to extend in the same direction as a longitudinal direction of the sheath 202. Further, the shielding plate 211 is configured so that a width parallel to the horizontal direction is, for example, wider than the sheath 202 of the liquid level detection sensor 22. The shielding plate 211 has an upper end side that is mounted and fixed to the upper surface portion 15AU of the container 15A. The shielding plate 211 is arranged in parallel to a surface of the discharge outlet A of the discharge outlet portion 151181.

The upper end of the shielding plate 211 is connected to the upper surface portion 15AU of the container 15A of a liquid reservoir 25. As a result, the shielding plate 211 can be prevented from flying up even when the refrigerant discharged from the discharge outlet portion 151B1 collides with the shielding plate 211.

Effects of Embodiment 2

In addition to the effects described in Embodiment 1, Embodiment 2 has the following effects.

The liquid level detection sensor 22 of the refrigeration cycle apparatus according to Embodiment 2 includes the shielding plate 211 provided at the position opposed to the sheath 202 and the heat generating elements 201a to 201d. Therefore, even when a distance between the discharge outlet A of the discharge outlet portion 151B1 and the liquid level detection sensor 22 is smaller than about five times the inner diameter D of the discharge outlet portion 151B1, the direct squirt of the refrigerant onto the liquid level detection sensor 22 can be suppressed. Specifically, the refrigerant discharged from the discharge outlet portion 151B1 flows along a wall surface of the shielding plate 211 (see the arrows F of FIG. 10A). Therefore, the decrease in detection accuracy of the liquid level detection sensor 22 can be suppressed.

Although a case where the shielding plate 211 is mounted to the upper surface portion 15AU is described in Embodiment 2, the position of the shielding plate 211 is not limited thereto. For example, the shielding plate 211 may be mounted to the side surface portion 15AS or may be mounted to the base surface portion 15AB.

Modification Example 1

Figure 10B:
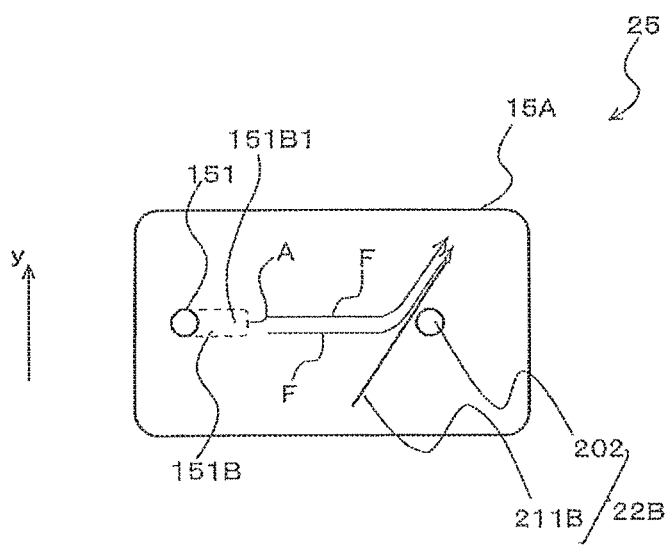
FIG. 10B is an illustration of Modification Example 1 of the shielding plate 211 of the liquid level detection sensor 22 of the refrigeration cycle apparatus according to Embodiment 2 of the present invention.

FIG. 10B is an illustration of Modification Example 1 of the shielding plate 211 of the liquid level detection sensor 22 of the refrigeration cycle apparatus according to Embodiment 2. As illustrated in FIG. 10B, a shielding plate 211B of a liquid level detection sensor 22B according to Modification Example 1 is arranged obliquely so as to form an angle with respect to a direction perpendicular to the direction in which the second pipe portion 151B extends. Specifically, the shielding plate 211B is arranged so that an angle formed with respect to the direction in which the second pipe portion 151B extends does not become a right angle. Here, when viewed from the discharge outlet portion 151B1 side, the shielding plate 211B is arranged so that a left end side portion is closer to the discharge outlet portion 151B1 than a right side end portion. The shielding plate 211B is provided to the liquid reservoir 25. As a result, the refrigerant discharged from the discharge outlet portion 151B1 flows smoothly along the shielding plate 211B. Thus, the oscillation of the liquid surface of the liquid refrigerant accumulated in the container 15A of the liquid reservoir 25 due to the refrigerant discharged into the container 15A can be suppressed.

Modification Example 2

Figure 10C:
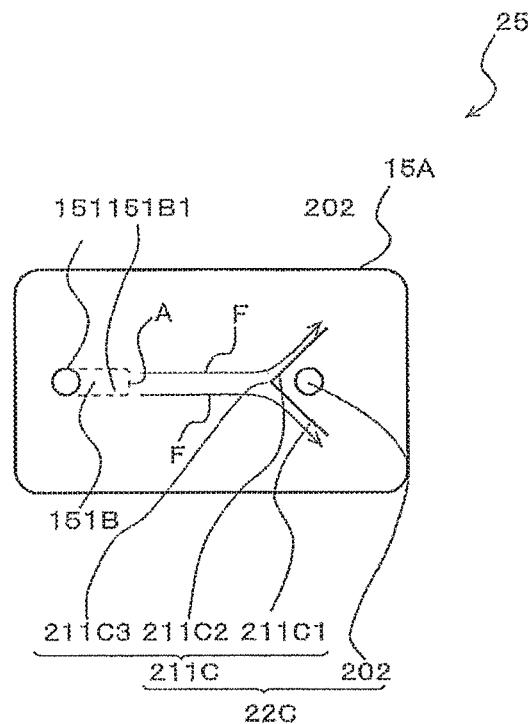
FIG. 10C is an illustration of Modification Example 2 of the shielding plate 211 of the liquid level detection sensor 22 of the refrigeration cycle apparatus according to Embodiment 2 of the present invention.

FIG. 10C is an illustration of Modification Example 2 of the shielding plate 211 of the liquid level detection sensor 22 of the refrigeration cycle apparatus according to Embodiment 2. As illustrated in FIG. 10C, a shielding plate 211C of a liquid level detection sensor 22C according to Modification Example 2 has an L-like shape as viewed on a horizontal cross section. Specifically, the shielding plate 211C includes a first plane portion 211C1, a second plane portion 211C2 connected to an end portion of the first plane portion 211C1, and a connecting portion 211C3 formed at a coupled portion between the first plane portion 211C1 and the second plane portion 211C2.

The first plane portion 211C1 is arranged so that a left end portion is closer to the discharge outlet portion 151B1 side than a right end portion as viewed from the discharge outlet portion 151B1 side. The second plane portion 211C2 is arranged so that a right end portion is closer to the discharge outlet portion 151B1 side than a left end portion as viewed from the discharge outlet portion 151B1 side. The connecting portion 211C3 is arranged so that a distance from the discharge outlet A becomes the shortest distance. Specifically, the connecting portion 211C3 is arranged in front of the discharge outlet A so as to be opposed thereto.

The shielding plate 211C is provided to the liquid reservoir 25. As a result, the refrigerant discharged from the discharge outlet portion 151B1 flows smoothly along the first plane portion 211C1 and the second plane portion 211C2 after colliding against the connecting portion 211C3. Specifically, the refrigerant is smoothly split into two directions by the function of the connecting portion 211C3, and then flows along the first plane portion 211C1 and the second plane portion 211C2. Thus, the oscillation of the liquid surface of the liquid refrigerant accumulated in the container 15A of the liquid reservoir 25 due to the refrigerant discharged into the container 15A can be suppressed.

Embodiment 3

Figure 11:
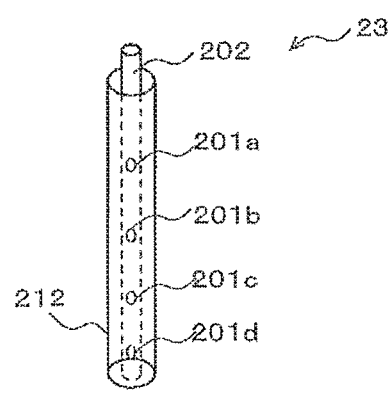
FIG. 11 is a view of a schematic configuration example of a liquid level detection sensor 23 included in a refrigeration cycle apparatus according to Embodiment 3 of the present invention.
Figure 12:
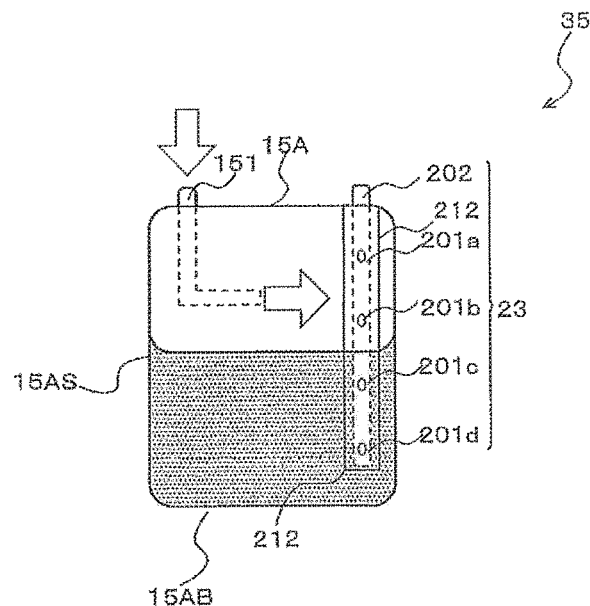
FIG. 12 is a view of a schematic configuration example of a liquid reservoir 35 to which the liquid level detection sensor 23 illustrated in FIG. 11 is mounted.

FIG. 11 is a view of a schematic configuration example of a liquid level detection sensor 23 included in a refrigeration cycle apparatus according to Embodiment 3 of the present invention. FIG. 12 is a view of a schematic configuration example of a liquid reservoir 35 to which the liquid level detection sensor 23 illustrated in FIG. 11 is mounted. In Embodiment 3, configurations common to Embodiment 1 and Embodiment 2 are denoted by the same reference symbols, and differences are mainly described. Embodiment 3 differs from Embodiment 1 and Embodiment 2 in that the liquid level detection sensor 23 includes a shielding barrel 212 having a tubular shape. The shielding barrel 212 described in Embodiment 3 corresponds to the shielding portion.

The shielding barrel 212 is provided so as to surround the sheath 202. An upper end of the shielding barrel 212 is connected and fixed to the upper surface portion 15AU of the container 15A. Further, the shielding barrel 212 has at least one open end. Specifically, the shielding barrel 212 has an open lower end side. Due to the open lower end of the shielding barrel 212, a height position of the liquid level is the same inside and outside of the shielding barrel 212. Further, the shielding barrel 212 is hollow so that the sheath 202 and the heat generating elements 201a to 201d can be accommodated on an inner surface.

Effects of Embodiment 3

In addition to the effects described in Embodiment 1, Embodiment 3 has the following effects.

The liquid level detection sensor 23 of the refrigeration cycle apparatus according to Embodiment 3 includes the shielding barrel 212 arranged so as to accommodate the sheath 202 and the heat generating elements 201a to 201d therein. Therefore, bypassing of the refrigerant colliding against the shielding barrel 212 to collide against the sheath 202 and the heat generating elements 201a to 201d can be suppressed. As a result, the decrease in detection accuracy of the liquid level detection sensor 23 can be more reliably suppressed.

Although the lower end of the shielding barrel 212 has been described as being open in Embodiment 3, the shielding barrel 212 is not limited thereto. For example, a hole to be used to cause the refrigerant to flow into the hollow space of the shielding barrel 212 may be formed in a lower portion of the shielding barrel 212.

Although a case where the shielding barrel 212 is mounted to the upper surface portion 15AU is described in Embodiment 3, the position of the shielding barrel 212 is not limited thereto. For example, the shielding barrel 212 may be mounted to the side surface portion 15AS or may be mounted to the base surface portion 15AB.

Although a case where the shielding barrel 212 and the sheath 202 are provided separately has been described as an example in Embodiment 3, the shielding barrel 212 and the sheath 202 are not limited thereto. For example, a fixing member configured to fix the shielding barrel 212 and the sheath 202 may be additionally provided. In this case, the shielding barrel 212 is not required to be fixed to the upper surface portion 15AU. Further, it is preferred that the fixing member be formed of a resin or other such material so that heat of the shielding barrel 212 is not transferred to the sheath 202 side.

Although the shielding barrel 212 having a cylindrical shape as viewed on the horizontal cross section has been described an example in Embodiment 3, the shape of the shielding barrel 212 is not limited thereto. For example, the shielding barrel 212 may have a polygonal shape as viewed on the horizontal cross section.

Embodiment 4

Figure 13:
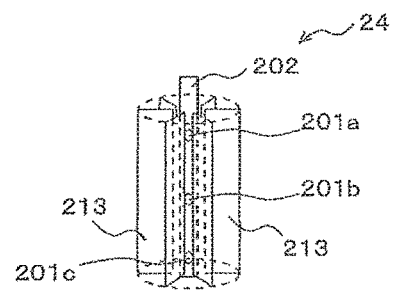
FIG. 13 is a view of a schematic configuration example of a liquid level detection sensor 24 included in a refrigeration cycle apparatus according to Embodiment 4 of the present invention.
Figure 14:
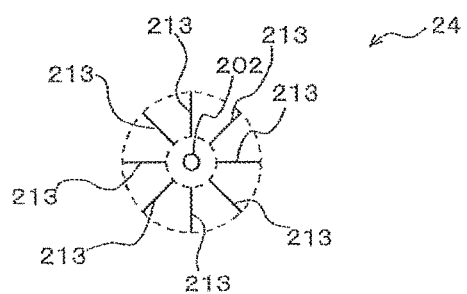
FIG. 14 is a view of the liquid level detection sensor 24 illustrated in FIG. 13 as viewed on a horizontal cross section.

FIG. 13 is a view of a schematic configuration example of a liquid level detection sensor 24 included in a refrigeration cycle apparatus according to Embodiment 4 of the present invention. FIG. 14 is a view of the liquid level detection sensor 24 illustrated in FIG. 13 as viewed on a horizontal cross section. In Embodiment 4, configurations common to Embodiment 1 to Embodiment 3 are denoted by the same reference symbols, and differences are mainly described. Embodiment 4 differs from Embodiment 1 to Embodiment 3 in that the liquid level detection sensor 24 includes a plurality of fins 213. The plurality of fins 213 described in Embodiment 4 correspond to the shielding portion.

The plurality of fins 213 are arranged radially around the sheath 202 as a center so as to surround the sheath 202. Upper ends of the plurality of fins 213 are connected and fixed to the upper surface portion 15AU of the container 15A. Each of the fins 213 can be made up of, for example, an oblong member parallel to a direction in which the sheath 202 extends. Although a case where the number of provided fins 213 is eight is described as an example in Embodiment 4, the same effects can be obtained as long as the number of fins is not one.

It is preferred that the fins 213 be formed of, for example, a less thermally conductive material. Specifically, although the fins 213 may be formed of a metal, it is more preferred that the fins be formed of a resin, glass, or other such material, which is less thermally conductive. As a result, transfer of the heat of the fins 213 to the sheath 202 and the heat generating elements 201a to 201d can be suppressed, thereby suppressing the decrease in detection accuracy of the liquid level by the liquid level detection sensor 24.

It is preferred that the fins 213 be provided at positions away from the sheath 202 so as not to come into contact with the sheath 202. In this manner, the transfer of the heat of the fins 213 to the sheath 202 and the heat generating elements 201a to 201d can be suppressed, thereby suppressing the decrease in detection accuracy of the liquid level by the liquid level detection sensor 24.

Effects of Embodiment 4

In addition to the effects described in Embodiment 1, Embodiment 4 has the following effects.

The liquid level detection sensor 24 of the refrigeration cycle apparatus according to Embodiment 4 includes the plurality of fins 213 arranged radially so as to surround the sheath 202 and the heat generating elements 201a to 201d. Therefore, the direct collision of the refrigerant discharged from the discharge outlet portion 151B1 into the container 15A against the sheath 202 and the heat generating elements 201a to 201d can be suppressed. More specifically, the suppression of collision is as follows.

Figure 15:
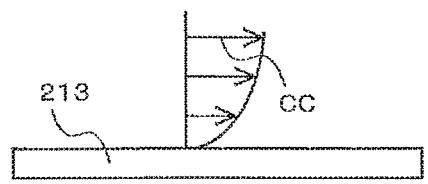
FIG. 15 is a diagram for schematically illustrating a flow velocity distribution CC at a fin 213 illustrated in FIG. 13 and FIG. 14.

FIG. 15 is a diagram for schematically illustrating a flow velocity distribution CC at the fin 213 illustrated in FIG. 13 and FIG. 14. As illustrated in FIG. 15, the flow velocity is illustrated as being reduced as a position becomes closer to the fin 213. Specifically, the velocity of the refrigerant at the position close to the fin 213 is decreased by a function of a wall surface of the fin 213.

An interval between the fins 213 increases on an outer side of the plurality of fins 213, and therefore the refrigerant easily passes between the fins 213. On an inner side of the plurality of fins 213 (on the sheath 202 side), however, the interval between the fins 213 is gradually reduced. Therefore, the refrigerant is more likely to flow along the wall surface of the fin 213. As a result, the velocity of the refrigerant is more likely to be reduced. As described above, the direct collision of the refrigerant discharged from the discharge outlet portion 151B1 into the container 15A against the sheath 202 and the heat generating elements 201a to 201d can be suppressed by the function of the fins 213.

Although a case where the plurality of fins 213 are mounted to the upper surface portion 15AU is described in Embodiment 4, the position of the plurality of fins 213 is not limited thereto. For example, the plurality of fins 213 may be mounted to the side surface portion 15AS or may be mounted to the base surface portion 15AB.

Although a case where the fins 213 and the sheath 202 are provided separately has been described as an example in Embodiment 4, the fins 213 and the sheath 202 are not limited thereto. For example, a fixing member configured to fix the fins 213 and the sheath 202 may be additionally provided. In this case, the fins 213 are not required to be fixed to the upper surface portion 15AU. Further, it is preferred that the fixing member be formed of a resin or other such material so that the heat of the fins 213 is not transferred to the sheath 202 side.

Embodiment 5

Figure 16:
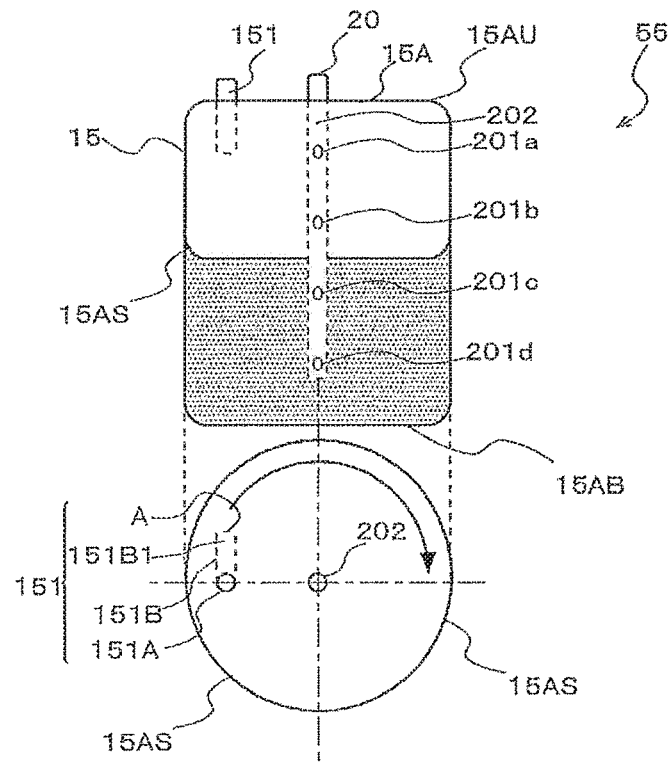
FIG. 16 is a view of a schematic configuration example of a liquid reservoir 55 and the like of a refrigeration cycle apparatus according to Embodiment 6 of the present invention.
Figure 17:
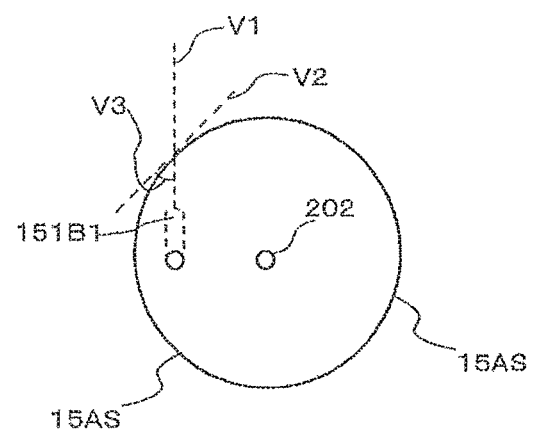
FIG. 17 is an explanatory diagram of an angle formed by a side surface portion 15AS of the container 15A of the first pipe portion 151A.

FIG. 16 is a view of a schematic configuration example of a liquid reservoir 55 and the like of a refrigeration cycle apparatus according to Embodiment 6 of the present invention. FIG. 17 is an explanatory diagram of an angle formed by the side surface portion 15AS of the container 15A of the first pipe portion 151A. In Embodiment 5 of the present invention, configurations common to Embodiments 1 to 4 are denoted by the same reference symbols, and differences are mainly described. In Embodiment 5, a position at which the liquid level detection sensor 20 is installed is a central portion of the container 15A. Further, the inlet pipe 151 differs from those of Embodiments 1 to 4 in that the inlet pipe 151 is arranged so that the refrigerant discharged from the discharge outlet portion 151B1 into the container 15A flows along the cylindrical side surface portion 15AS of the container 15A.

The liquid level detection sensor 20 is arranged in the central portion of the container 15A. The position of the liquid level detection sensor 20 is not required to completely match the central portion of the container 15A, and may be slightly shifted therefrom.

The inlet pipe 151 is provided to the container 15A so that an angle formed between a direction in which the second pipe portion 151B extends and a curved surface of the side surface portion 15AS of the container 15A is reduced. More specifically, the inlet pipe 151 is provided in the container 15A so that an angle V3 formed between a central axis V1 of the second pipe portion 151B and a tangent V2 of the side surface portion 15AS at an intersection between the central axis V1 and the side surface portion 15AS is reduced. In other words, the arrangement is such that the angle V3 formed between the central axis V1 of the second pipe portion 151B and the tangent V2 of the container 15A at the intersection position between the central axis V1 and the container 15A is acute. For the angle V3, when the angle V3 is set, for example, so as to be smaller than 45 degrees, a smoother swirl flow that is more likely to flow along an inner surface of the container 15A can be formed in the container 15A. As a result, the refrigerant flow velocity in the central portion of the container 15A can be reduced.

Effects of Embodiment 5

In addition to the effects described in Embodiment 1, Embodiment 5 has the following effects.

In the refrigeration cycle apparatus according to Embodiment 5, the inlet pipe 151 is arranged so as not to be positioned in front of the discharge outlet portion 151B1. Then, the inlet pipe 151 is provided in the container 15A so that the angle formed between the direction in which the second pipe portion 151B extends and the curved surface of the side surface portion 15AS of the container 15A is reduced. Further, the liquid level detection sensor 20 is arranged in the central portion of the container 15A.

Figure 18:
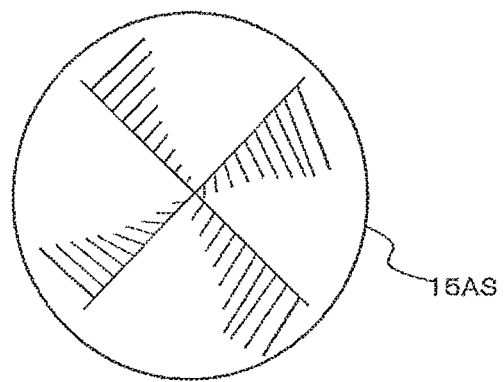
FIG. 18 is a diagram for schematically illustrating a flow velocity distribution when the container 15A illustrated in FIG. 16 is viewed from the upper surface side.

FIG. 18 is a diagram for schematically illustrating a flow velocity distribution when the container 15A illustrated in FIG. 16 is viewed from the upper surface side. From FIG. 18, it is understood that the refrigerant velocity is larger on a side close to the side surface portion 15AS than in the central portion of the container 15A. Specifically, the refrigerant discharged from the discharge outlet portion 151B1 into the container 15A swirls along the side surface portion 15AS. Therefore, the refrigerant at a high velocity is likely to be distributed on the side surface portion 15AS. The refrigerant swirling along the side surface portion 15AS is centrifugally separated into a gas refrigerant and a liquid refrigerant. The liquid level detection sensor 20 is arranged in the central portion of the container 15A in which the refrigerant at a low velocity is distributed. Therefore, the decrease in detection accuracy can be suppressed.

Modification Example

Figure 19:
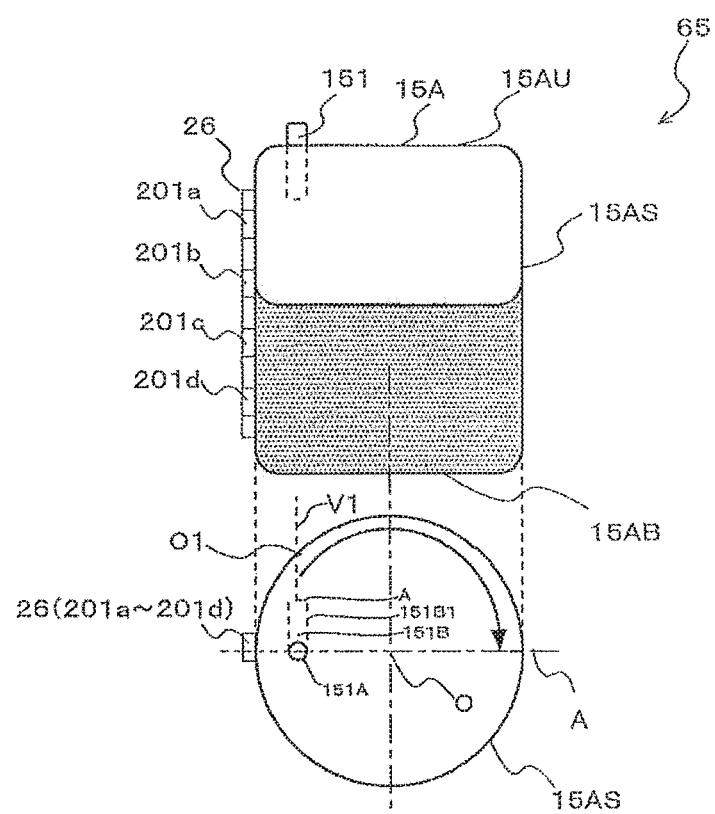
FIG. 19 is an illustration of a modification example of Embodiment 5 of the present invention.

FIG. 19 is a modification example of Embodiment 5. Although the liquid level detection sensor 20 is arranged in the container 15A in Embodiment 5, the arrangement of the liquid level detection sensor is not limited thereto. For example, as illustrated in FIG. 19, a liquid level detection sensor 26 may be provided on an outer surface of the container 15A. The liquid level detection sensor 26 is arranged so as to be positioned on the same straight line as a center O of the container 15A and the first pipe portion 151A. Further, when an intersection between the central axis V1 of the first pipe portion 151A and the side surface portion 15AS is O1, the liquid level detection sensor 26 is provided at a position avoiding the position O1. The position indicated as O1 is a portion against which a cold refrigerant that has just flown out of the inlet pipe 151 collides, and therefore a temperature is likely to decrease. Therefore, in this modification example, the liquid level detection sensor 26 is installed so as to avoid the position indicated as O1. In this manner, the decrease in detection accuracy of the liquid level detection sensor 26 is suppressed.

REFERENCE SIGNS LIST 1 refrigeration cycle apparatus 11 compressor 12 condenser
12A air-sending device 13 expansion device 14 evaporator 14A air-sending device 15 liquid reservoir 15A container 15A1 opening port
15AB bottom surface portion 15AS side surface portion 15AU upper surface portion 20 liquid level detection sensor 20A liquid level detection sensor 20B liquid level detection sensor 20C liquid level detection sensor
22 liquid level detection sensor 22B liquid level detection sensor
22C liquid level detection sensor 23 liquid level detection sensor 24 liquid level detection sensor 25 liquid reservoir 26 liquid level detection sensor 35 liquid reservoir 50 controller 55 liquid reservoir 100 refrigeration cycle apparatus 150 liquid reservoir 150B liquid reservoir 150C liquid reservoir 150D liquid reservoir 150E liquid reservoir
151 inlet pipe 151A first pipe portion 151B second pipe portion
151B1 discharge outlet portion 152 outlet pipe 152A first pipe portion 152B second pipe portion 152C third pipe portion 201a heat generating element 201b heat generating element 201c heat generating element 201d heat generating element 202 sheath 203 wiring 211 shielding plate 211B shielding plate 211C shielding plate 211C1 first plane portion 211C2 second plane portion 211C3 connecting portion
212 shielding barrel 213 fin A discharge outlet B core region
C refrigerant circuit C1 flow velocity distribution C2 flow velocity distribution C3 flow velocity distribution CC flow velocity distribution D inner diameter F arrow G gas refrigerant L liquid refrigerant O center P packing member V1 central axis V2 tangent V3 angle

The invention claimed is:

1. A refrigeration cycle apparatus comprising:
a refrigerant circuit formed by connecting, by a refrigerant pipe, a compressor, a condenser, an expansion device, an evaporator and a liquid reservoir;
a liquid level detection sensor including a heat generating unit including a heating body and a detection unit including a temperature sensor, the heat generating unit being paired with the detection unit, the liquid level detection sensor being provided in the liquid reservoir, and configured to detect a state of the heat generating unit to detect a liquid level of refrigerant accumulated in the liquid reservoir,
the liquid reservoir including
a container configured to accumulate the refrigerant,
an inlet pipe connected to the refrigerant circuit and configured to allow a portion of the refrigerant flowing outside the container to flow into the container, the refrigeration cycle apparatus comprising, in the container,
a shield configured to prevent the portion of the refrigerant outside a discharge outlet for the refrigerant of the inlet pipe from directly coming into contact with the liquid level detection sensor.

2. The refrigeration cycle apparatus of claim 1, wherein the shield is provided between the discharge outlet for the refrigerant of the inlet pipe and the liquid level detection sensor and comprises a flat plate-like shielding plate.

3. The refrigeration cycle apparatus of claim 2, wherein the shield has one side end portion arranged so as to be closer to the discharge outlet for the refrigerant of the inlet pipe than an other side end portion is to the discharge outlet.

4. The refrigeration cycle apparatus of claim 1, wherein the shield comprises
a first plane portion having one side end portion arranged so as to be closer to the discharge outlet for the refrigerant of the inlet pipe than an other side end portion; and
a second plane portion having an other side end portion arranged so as to be closer to the discharge outlet for the refrigerant of the inlet pipe than one side end portion, the other side end portion being connected to the one side end portion of the first plane portion.

5. The refrigeration cycle apparatus of claim 4, wherein the shield further comprises a connecting portion formed at a position at which the first plane portion and the second plane portion are connected to each other, and the connecting portion is arranged so that a distance from the discharge outlet for the refrigerant of the inlet pipe is a shortest distance.

6. The refrigeration cycle apparatus of claim 1, wherein the shield comprises a plurality of fins arranged radially around the heat generating unit and the detection unit as a center.

7. The refrigeration cycle apparatus of claim 1, wherein the shield comprises a shielding barrel configured to accommodate therein the heat generating unit and the detection unit, and has one open end.

8. The refrigeration cycle apparatus of claim 1, wherein the liquid level detection sensor comprises a plurality of heat generation units and a plurality of the detection units and is configured to detect a liquid level of the refrigerant reserved in the liquid reservoir based on the temperature of the heat generating unit, and comprises a sheath having an elongated shape, to which the plurality of heat generating units and the plurality of detection units are provided.

9. The refrigeration cycle apparatus of claim 8,
wherein the sheath comprises a plurality of the sheaths, and
each of the plurality of the sheaths has a different height position at which one of the plurality of heat generating units is installed.

10. The refrigeration cycle apparatus of claim 8, wherein the liquid level detection sensor includes the plurality of heat generating units and the plurality of detection units as the same body.

11. A liquid level detection sensor to be provided to a liquid reservoir of a refrigeration cycle apparatus, comprising
a sheath having an elongated shape;
a heat generating unit including a heating body and a detection unit including a temperature sensor being paired with the heat generating unit, which are provided to the sheath; and
a shield provided at a predetermined distance from the sheath, the shield being formed so as to extend in a longitudinal direction of the sheath.

12. The liquid level detection sensor of claim 11, wherein the shield comprises a flat plate-like shielding plate.

13. The liquid level detection sensor of claim 11, wherein the shield comprises a plurality of fins arranged radially around the sheath as a center.

14. The liquid level detection sensor of claim 11, wherein the shield comprises a shielding barrel configured to accommodate therein the sheath.

15. The refrigeration cycle apparatus of claim 14, wherein the shielding barrel has at least one open end.

16. A refrigeration cycle apparatus, comprising:
a refrigerant circuit formed by connecting, by a refrigerant pipe, a compressor, a condenser, an expansion device, an evaporator, and a liquid reservoir;
a liquid level detection sensor including a heat generating unit including a heating body and a detection unit including a temperature sensor, the heat generating unit being paired with the detection unit, the liquid level detection sensor being provided in the liquid reservoir and configured to detect a liquid level of a refrigerant accumulated in the liquid reservoir,
the liquid reservoir comprising
a container having a cylindrical shape, which is configured to accumulate the refrigerant; and
an inlet pipe having a discharge outlet portion formed on an inlet side to the container for the refrigerant, being connected to the refrigerant circuit, and being configured to allow a portion of the refrigerant outside of the container to flow into the container, the discharge outlet portion being arranged so that an angle formed between a central axis of the discharge outlet portion and a tangent of the container at an intersection position between the central axis and the container is acute, and the liquid level detection sensor being provided at a position away from a front of the discharge outlet for the refrigerant of the inlet pipe.

17. The refrigeration cycle apparatus of claim 16, wherein the liquid level detection sensor is arranged at a position on an outer surface of the container so as to avoid the intersection position.

18. The refrigeration cycle apparatus of claim 16, wherein the liquid level detection sensor is provided at a central part of the container.

19. A refrigeration cycle apparatus, comprising:

a refrigerant circuit formed by connecting, by a refrigerant pipe, a compressor, a condenser, an expansion device, an evaporator, and a liquid reservoir;

a liquid level detection sensor including a heat generating unit including a heating body and a detection unit including a temperature sensor, the heat generating unit being paired with the detection unit, and provided in the liquid reservoir, the liquid level detection sensor being configured to detect a state of the heat detection unit by the detection unit to detect a liquid level of refrigerant accumulated in the liquid reservoir based on a temperature of the heat generating unit, the liquid reservoir comprising a container configured to accumulate the refrigerant; and an inlet pipe including a pipe portion extending in a horizontal direction, the pipe portion having one end positioned inside the container, the one end of the pipe portion having a discharge outlet portion, the inlet pipe being connected to the refrigerant circuit, and the inlet pipe being configured to allow a portion of the refrigerant outside of the container to flow into the container, wherein in the container, when a conical space, which is formed between a position on a central axis of the discharge outlet portion and a distal end edge of an inner surface of the discharge outlet portion, is defined as a core region, and the position on the central axis of the discharge outlet portion is located forward on the central axis by five times an inner diameter of the discharge outlet portion based on a position of a discharge outlet of the discharge outlet portion as a reference, the liquid level detection sensor is provided at a position other than the core region.

* * * * *